(12) United States Patent
North

(10) Patent No.: US 8,850,417 B2
(45) Date of Patent: Sep. 30, 2014

(54) METHOD AND FRAMEWORK FOR INVISIBLE CODE REWRITING

(75) Inventor: Geraint North, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 13/440,174

(22) Filed: Apr. 5, 2012

(65) Prior Publication Data

US 2012/0266150 A1 Oct. 18, 2012

(30) Foreign Application Priority Data

Apr. 15, 2011 (EP) .................................... 11162662

(51) Int. Cl.
*G06F 9/45* (2006.01)
*G06F 9/44* (2006.01)
*G06F 9/445* (2006.01)

(52) U.S. Cl.
CPC ........................ *G06F 8/67* (2013.01)
USPC ............ 717/148; 717/136; 717/140; 717/151

(58) Field of Classification Search
CPC ............... G06F 8/41; G06F 8/52; G06F 8/67; G06F 8/443; G06F 9/45516
See application file for complete search history.

(56) References Cited

U.S. PATENT DOCUMENTS

| | | | | |
|---|---|---|---|---|
| 8,281,296 B2* | 10/2012 | Vick et al. | | 717/152 |
| 8,286,152 B2* | 10/2012 | Grcevski et al. | | 717/148 |
| 8,365,157 B2* | 1/2013 | Lagergren | | 717/148 |
| 8,555,264 B2* | 10/2013 | Ohrstrom | | 717/148 |
| 8,578,352 B1* | 11/2013 | Mitrovic et al. | | 717/140 |
| 8,713,546 B2* | 4/2014 | Lagergren | | 717/151 |
| 2003/0101322 A1* | 5/2003 | Gardner | | 711/163 |
| 2004/0177243 A1* | 9/2004 | Worley, Jr. | | 713/2 |
| 2008/0313618 A1* | 12/2008 | Broman et al. | | 717/130 |
| 2010/0042980 A1* | 2/2010 | Wright et al. | | 717/146 |
| 2011/0219362 A1* | 9/2011 | Andrade et al. | | 717/136 |
| 2012/0159463 A1* | 6/2012 | Druch et al. | | 717/140 |

OTHER PUBLICATIONS

Meghanathan et al., Virtualization of virtual memory address space, Oct. 2012, 6 pages.*
Prokopski et al., Analyzing the performance of code-copying virtual machines, Oct. 2008, 10 pages.*
G. Hoglund et al., Untitled, published on the world wide web at www.acm.uiuc.edu/sigmil/talks/shadowwalker/ Shadow+Walker+Talk.pdf, publication date unknown.

* cited by examiner

*Primary Examiner* — Thuy Dao
(74) *Attorney, Agent, or Firm* — Roy W. Truelson

(57) ABSTRACT

This invention relates to a method and framework for invisible code rewriting. A method, system, and computer program for allowing modification of executable program code in a computer platform comprising: providing a virtual address space on the platform, said virtual space comprising a first and second address space; identifying a program into the first address space; identifying an enhancement to the program; copying the program into the second address space; modifying the program copy in the second address space to provide the enhancement; and configuring the platform to execute the program and executing the enhanced program in second address space.

13 Claims, 11 Drawing Sheets

PRIOR ART   Figure 2

Extended space manager 52

Code enhancement method 500

Extended Space Table 56

| App | EMS | EMS' | Mod |
|---|---|---|---|
| Sametime v8.5 | 1 | 2 | Patch v1.1 for Sametime v8.5 |
| | | | |

Figure 4

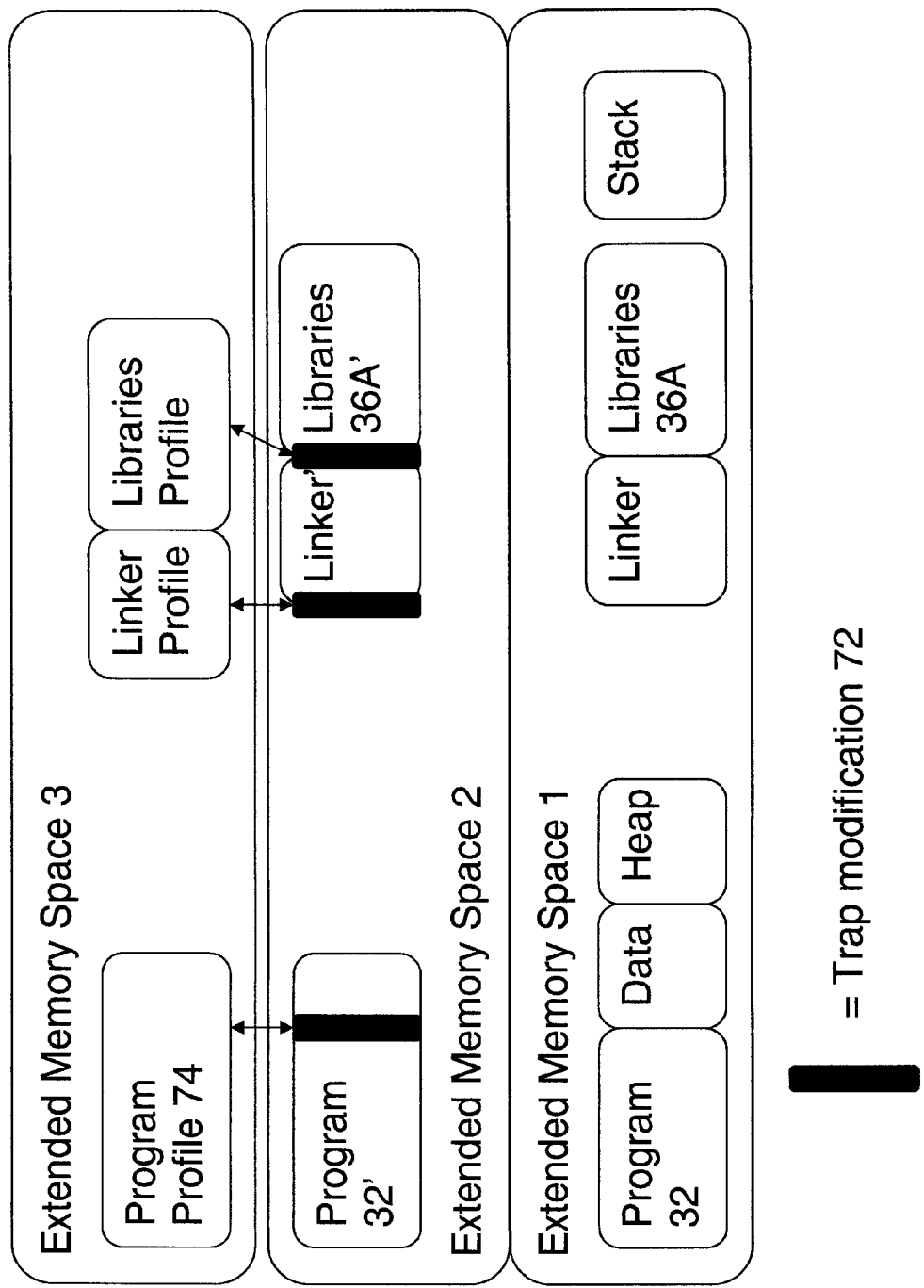

METHOD AND FRAMEWORK FOR INVISIBLE CODE REWRITING

This invention relates to a method and framework for invisible code rewriting.

BACKGROUND

It is known for an operating system to rewrite an application's program code on-the-fly to improve performance. Mechanisms for rewriting include: rescheduling instructions; planting pre-fetches; and software breakpoints.

Some advanced copy-protection and anti-reverse-engineering mechanisms require a program to inspect and checksum its own binary code prior to execution; any modifications due to instrumentation or performance enhancement would cause these checksums to fail.

A program that allows such a mechanism to update parts of its code on-the-fly might also checksum its code prior to applying the update in order to ensure that the update is being applied to the correct version of the code. Furthermore, a program that uses more than one such mechanism needs to protect itself so that the mechanisms do not interact badly with other code.

Rewriting code in-place can cause functional problems if the program jumps into the middle of what was assumed to be a single indivisible code block. The re-ordering of instructions within that block might provide correct behavior if the block is executed in its entirety, but not if only part of the block is executed.

However, currently rewriting mechanisms do not allow modifications to be performed in a way that makes a rewrite to program code invisible to the program itself or any other program in the program layer.

One solution relates to hiding processor processes from detection from a program that is looking for processor processes. The solution, called Shadow Walker, provides a mechanism using page protection and catching faults, it further modifies a page table that program walks prior to allowing the operation to be performed. It is specific to the X86 processor and does not support systems with multiple processors.

Therefore, there is a need in the art to address the aforementioned problem.

SUMMARY OF INVENTION

In a first aspect of the invention there is provided a method as described in claim 1.

Advantageously, the present invention provides a method in the kernel and a modified instruction fetch in the processor; in other embodiments the method can be fully embodied in a processor, fully embodied in the firmware of the processor; or fully embodied embedded in a virtual machine or a hypervisor layer. Essentially the method must be embedded below a program layer to have the desired effect in the program layer.

The programs and user interfaces in the first address space see only the unmodified first program in the first address space and cannot detect the enhanced program in the second extended memory space.

The invention accesses microprocessor virtual memory to build a framework for transparent code modification. The framework allows a stream of instructions as executed by a program to differ from the data as seen by load and store instructions to the processes address space.

In a second aspect of the invention there is provided a system as described in claim 12.

In a third aspect of the invention there is provided a computer program product as described in claim 23.

In a fourth aspect of the invention there is provided a computer program as described in claim 34.

DESCRIPTION OF DRAWINGS

Embodiments of the invention will now be described, by means of example only, with reference to the accompanying drawings in which:

FIG. 4 is a schematic component diagram of an extended space manager according to the preferred embodiment;

FIGS. 7A to 7E are schematic representations of different examples of extended memory space.

DESCRIPTION OF THE EMBODIMENTS

Figure 1:
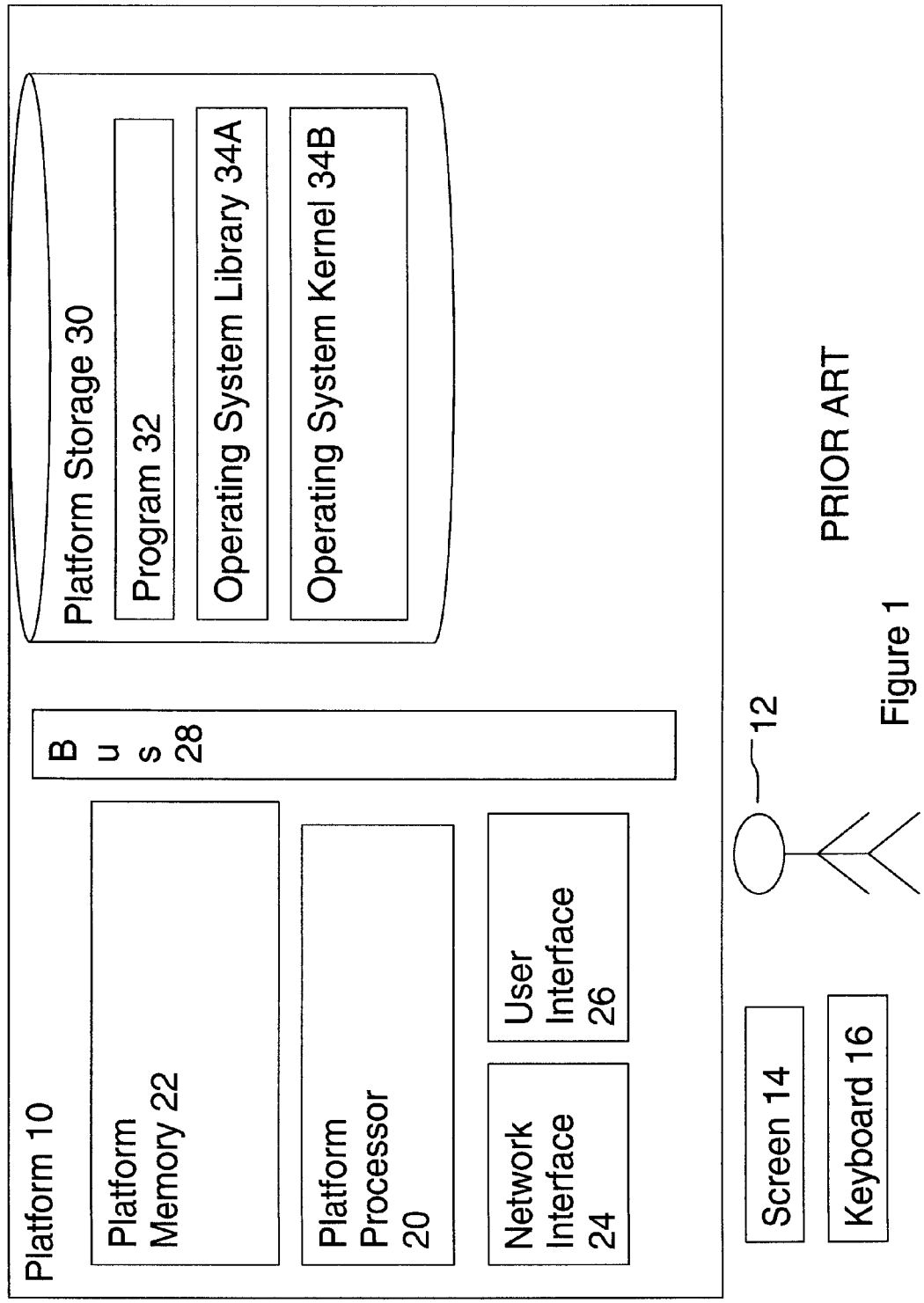
FIG. 1 is a schematic deployment diagram of a prior art multi-processor emulator system of the preferred embodiment.

Referring to FIG. 1, there is shown a deployment diagram of a platform 10 for interaction with user 12 using screen 14 and keyboard 16. Platform 10 comprises: platform processor 20; platform memory 22; network interface 24; platform user interface 26; bus 28 and platform storage 30. An example of platform 10 is an IBM* POWER* 750 Express* server.

Processor 20 takes instructions and data from platform memory 22 for performing logical operations on data according to the instructions. Examples of instructions include add data, subtract data, read data, write data. An example of a processor is an IBM POWER7* processor. Examples of operating systems that run on an IBM Power? are IBM AIX* and Linux*.

Platform memory 22, faster than platform storage 30, is designed for fast access so that it does not limit processor speed. In operation processor access and executes code stored in platform memory 22. An example of the code is program 32. An example of execution memory is 8 gigabyte to 512 gigabyte registered dual in-line memory modules (RDIMM) comprising a series of dynamic random access memory (DRAM) integrated circuits.

Network interface 24 is for communicating with other platforms connected to platform 10 on a network, for example, a local area network (LAN) or the Internet. Typically such communications are service calls when platform 10 will request another network device to provide a service such as performing an operation on supplied data.

Platform user interface 26 is for receiving input from user 12 via keyboard 16, mouse or other human input device. It is also for sending output to user 12 via screen 14, speakers or other human output device.

Bus 28 provides the communication paths for instructions and data between processor 20, platform memory 22, network interface 24, platform user interface 26 and platform storage 30.

Storage memory 30 is slower than working memory 22 but is designed to hold much more data. An example of storage memory is an 8 terabyte disk drive. When the platform is not operating then platform memory 22 is empty; platform storage 30 stores both execution code for upload to working memory and data for use with the execution code. The execution code of the preferred embodiment comprises; program 32; and operating system libraries 34A and operating system kernel 34B.

Program 32 can be any program that interacts with a user using the standard operating system 34 methods for input and output.

Operating system library 34A is for providing basic platform operating functions such as file storage and input/output functions.

Figure 2:
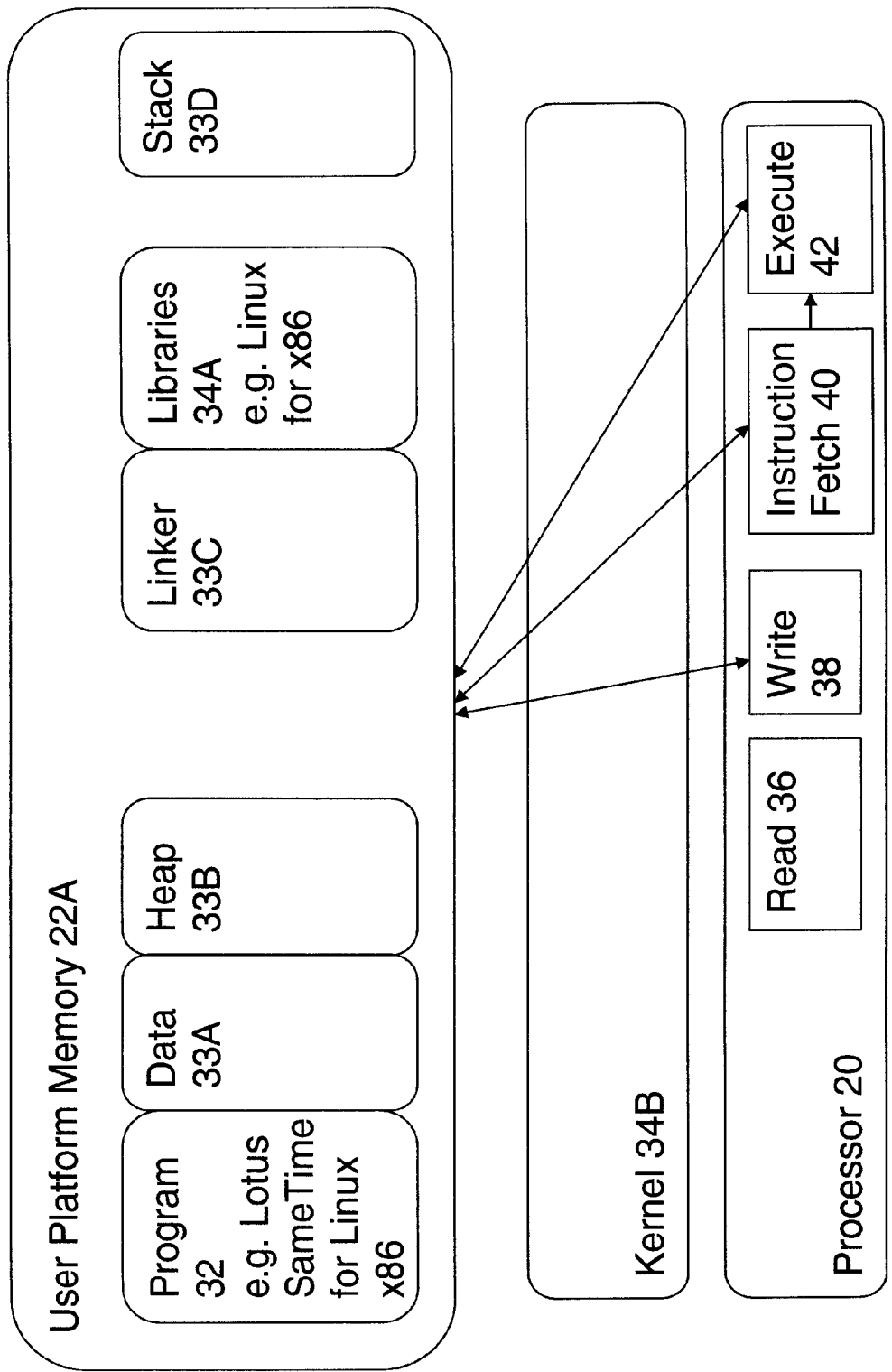
FIG. 2 is schematic prior art execution space diagram.

Operating system kernel 34B makes available a core set of processor logic explained further in FIG. 2.

Referring to FIG. 2, execution space for program 32 comprises user platform memory 22A (part of platform memory 22); kernel 34 and processor 20B (prior art).

During execution, linker 33C and program 32 are loaded into to user platform memory 22A. During runtime, the address space is further populated with data 33A; heap 33B; libraries 34A and stack 33D.

Data 33A is for storing general program data.

Heap 33B is allocated at runtime.

Linker 33C is executable code responsible for loading programs and required libraries.

Stack 33D is for storing program data using a stack storing mechanism.

Processor 20 includes a number of components used in the embodiment: read logic 36; write logic 38; instruction fetch logic 40; and execute logic 42.

Read logic 36 is for acquiring data from platform memory 22.

Write logic 38 is for writing data (including possible modifications to program code) to platform memory 22.

Instruction fetch logic 40 is used to acquire the next instruction for execution from platform memory 22 and to keep track of the current executing instruction.

Execute logic 42 is for executing instructions fetched by instruction fetch 40.

Any executable code stored in the user memory can be modified by the preferred embodiment and the modification not be seen by accesses by the read logic 36 and write logic 38.

Figure 3:
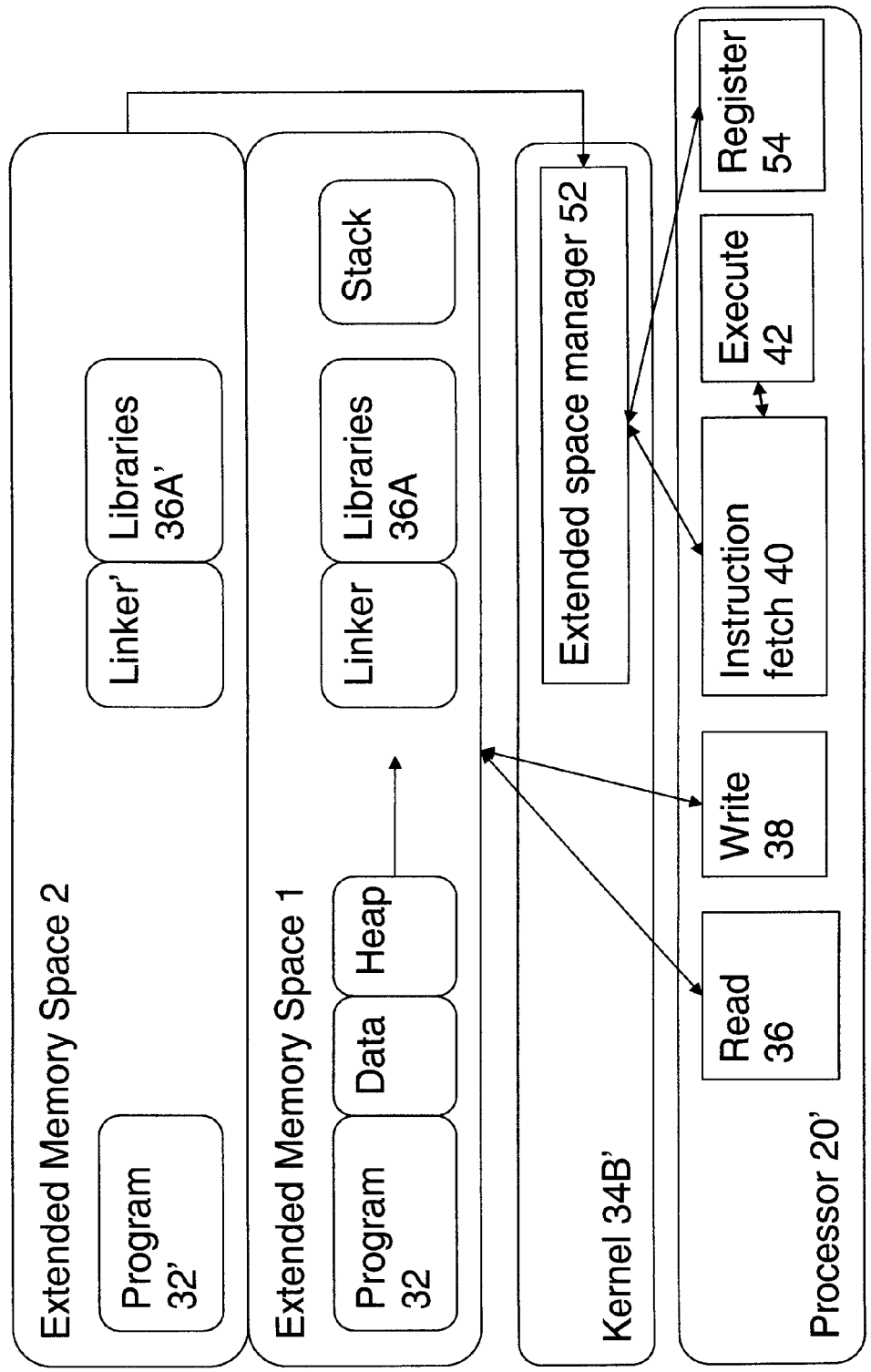
FIG. 3 is a schematic memory space showing extended memory space, a modified kernel and a modified processor of the preferred embodiment.

Referring to FIG. 3, the preferred embodiment of the invention comprises modified operating system kernel 34B' and modified processor 20'. Extended memory spaces 1 and 2 are shown in FIG. 3 and created during operation of embodiment.

Extended memory space 1 and 2 are different virtual address spaces in virtual extended memory. Each extended memory space is addressed in the same way within the same address range but the physical contents at any given location may be different depending on which space is referred to.

Extended memory space 1 comprises: program 32; libraries 36A and other application components.

Extended memory space 2 comprises: program 32' (a copy of program 32); and associated libraries 36A' (copy of libraries 36A). Extended memory space 2 is shown after the program copy 32' has been copied from program 32.

Modified processor 20' contains the same essential logic as the processor 20 that is: read 36; write 38; instruction fetch 40; and execute 42. In addition, modified processor 20' comprises register 54 that controls the extended memory space that is used by the processor logic.

Register 54 holds values to identify which extended memory space is to be accessed by each type of memory access instruction (in this example, read write, fetch).

Register 54 allows alternative (in this embodiment 64-bit) address spaces to be addressed by read, write and fetch using additional bits provided by the register 54. In effect, register 54 extends the 64-bit effective address space differently for read, write and fetch operations used by user-level processes to access memory with extra bits containing the EMS to be used. In this description extended memory space (EMS) is identified by EMS 1, EMS 2 and EMS n, and the Register 54 contains the EMS value to be used by fetch operations, with read and write operations using EMS 1.

Modified operating system kernel 34B' comprises extended space manager 52.

Extended space manager 52 provides a configuration method 600 for Kernel 34B to configure the extended memory spaces. Prior to execution of a process, the Extended space manager 52 identifies the extended memory space to be used for instruction fetch for a particular process (602), and configures register 54 appropriately prior to executing the process (604).

When instruction fetch 40 reads the next instruction to execute, it combines the virtual address of the read with the EMS in register 54 to form the virtual extended memory address for the operation.

Referring to FIG. 4, extended space manager 52 comprises: code enhancement method 500; and extended space table 56.

Code enhancement method 500 controls enhancements made to a program and access to the extended memory space for execution commands. Code enhancement method 500 is described in more detail below with reference to FIG. 5.

Extended space table 56 stores records of enhancements made to programs so that register 54 can be set to the correct extended space. The table comprises columns for program name and version; originating extended memory space (EMS); enhanced extended memory space (EMS'); and patch or modification version (Mod). In FIG. 4, an example program is given as IBM® Sametime® v8.5, originally loaded into EMS 1 and having been copied and enhanced in EMS 2 with Patch v1.1 for IBM Sametime v8.5.

Figure 5:
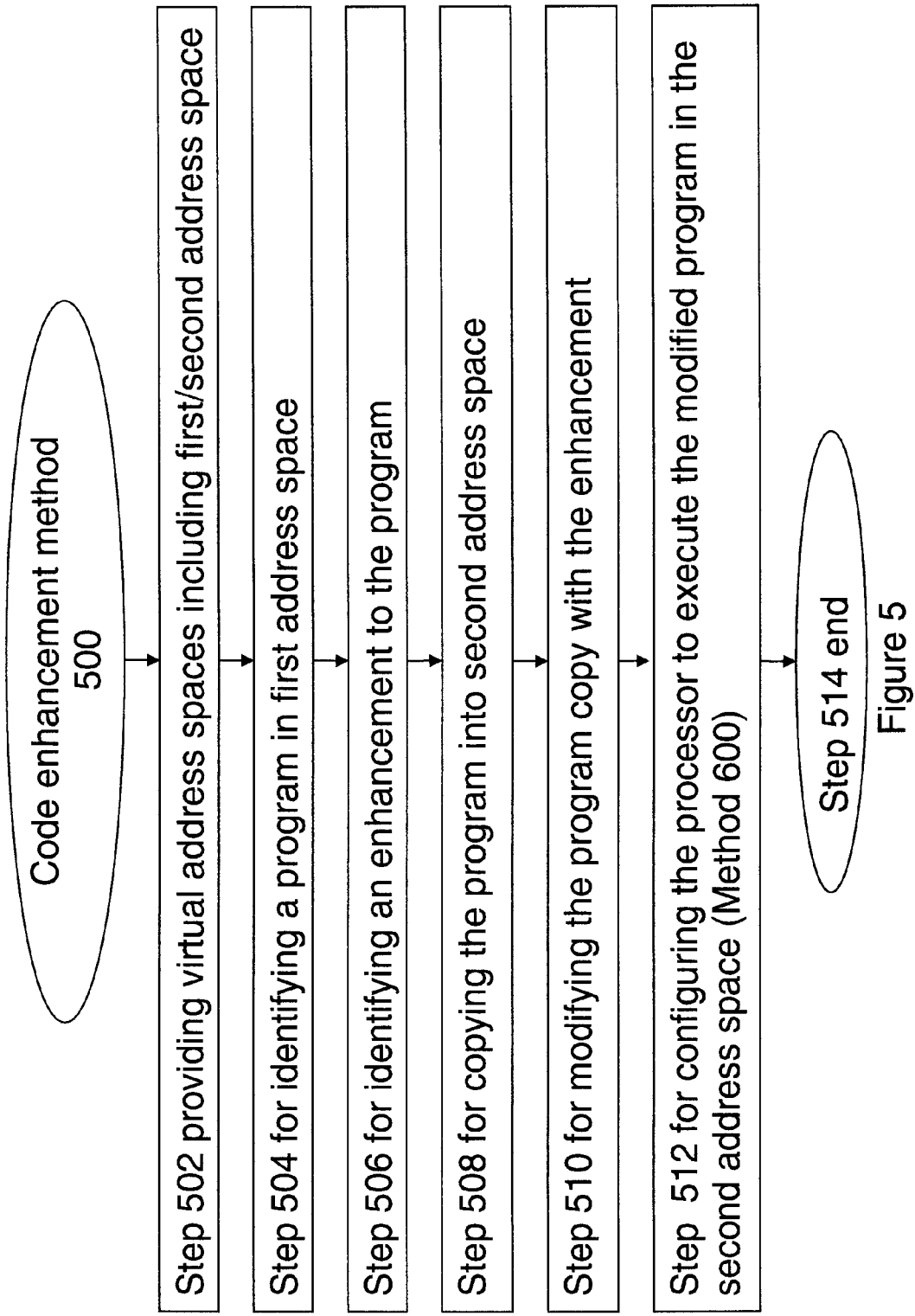
FIG. 5 is a schematic process diagram of a code enhancement method according to the preferred embodiment.

Referring to FIG. 5, code enhancement method 500 comprises logical process steps starting with logical process step 502 and ending with logical to 514.

Step 502 is for providing virtual address spaces including first, second and more address spaces. Extended space manager 52 controls access to one, two, or any number of extended memory spaces.

Step 504 is for identifying a program in a first space. When a program is first loaded into memory, extended space manager acquires the name and version of the program and registers, in extended space table 56, the extended space in which the program is stored.

Step 506 is for identifying an enhancement to the program. Extended space manager will check local storage and network resources for patches or an enhanced version of the program.

Step 508 is for copying the program into the second or another address space provided in step 502. Extended space table 56 is updated with the identifier of the new extended memory space.

Step 510 is for modifying the program with the located enhancement. Extended space manager 52 can make small corrections, apply patches or replace the entire code. Extended space table 56 is updated to show that the program has been enhanced with a particular modification.

Step 512 is for configuring register 54 to set the extended memory space to that of the enhanced program. Configuration method 600 is an optimized method of configuring the processor according to the preferred embodiment and is described below with reference to FIG. 600.

Step 514 signals the end of the method.

Figure 6:
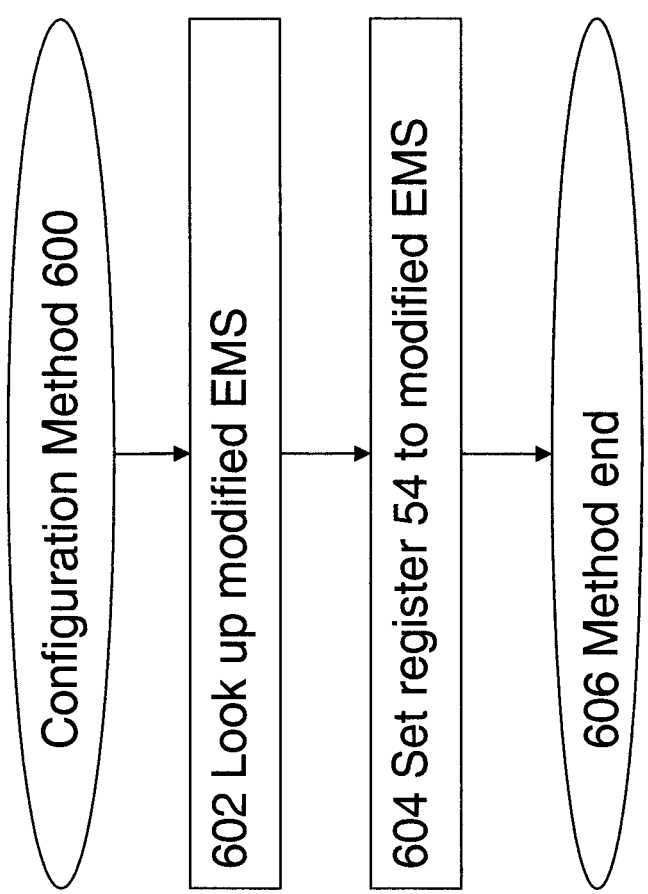
FIG. 6 is a schematic process diagram of an configuration method of the preferred embodiment.

Referring to FIG. 6, configuration method 600 comprises logical process steps 602, 604 and 606.

Step 602 is for looking up the name of a program in the extended space table 56. The table will tell the method if the program has been enhanced and which extended space the enhancement is stored.

Step 604 is for setting register 54 to the extended space where the enhancement is stored.

Step 606 is the end of the method.

Referring to FIG. 7A to 7E, virtual extended memory space is described comprising one or more of first, second and third extended memory space. Each of FIGS. 7A to 7E depicts a different example of enhancements to program code.

Figure 7A:
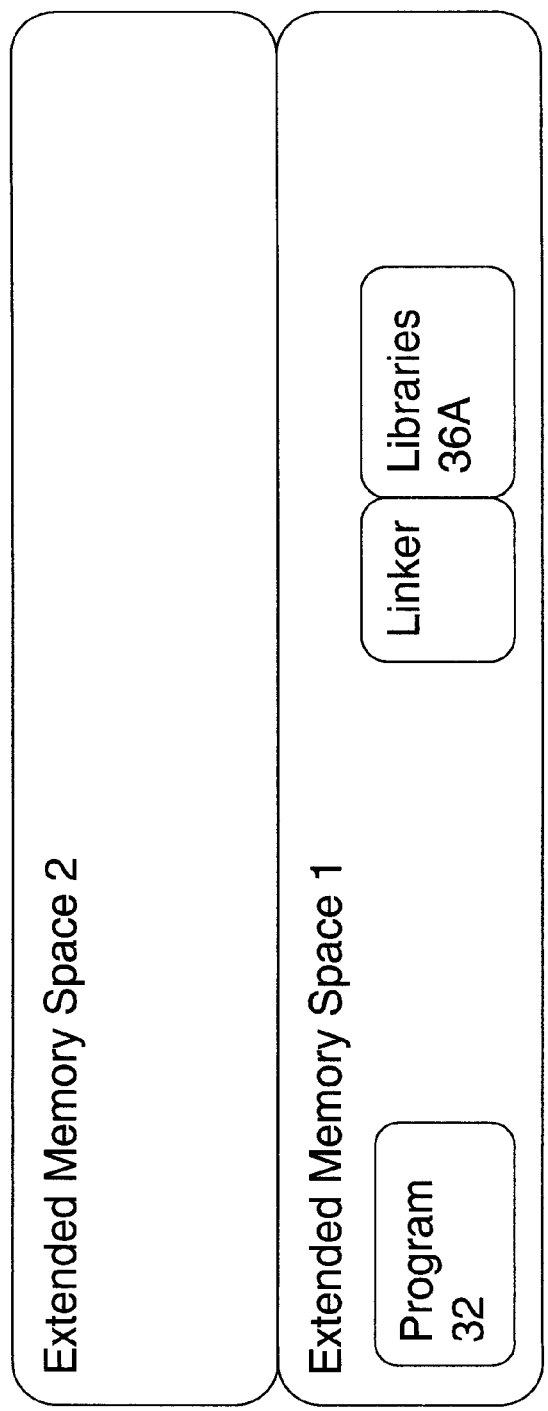

Referring to FIG. 7A, EMS 1 and 2 are shown. EMS 1 comprises program 32 as described with reference to FIG. 2 onwards. EMS 2 is empty since no modifications have been made.

Figure 7B:
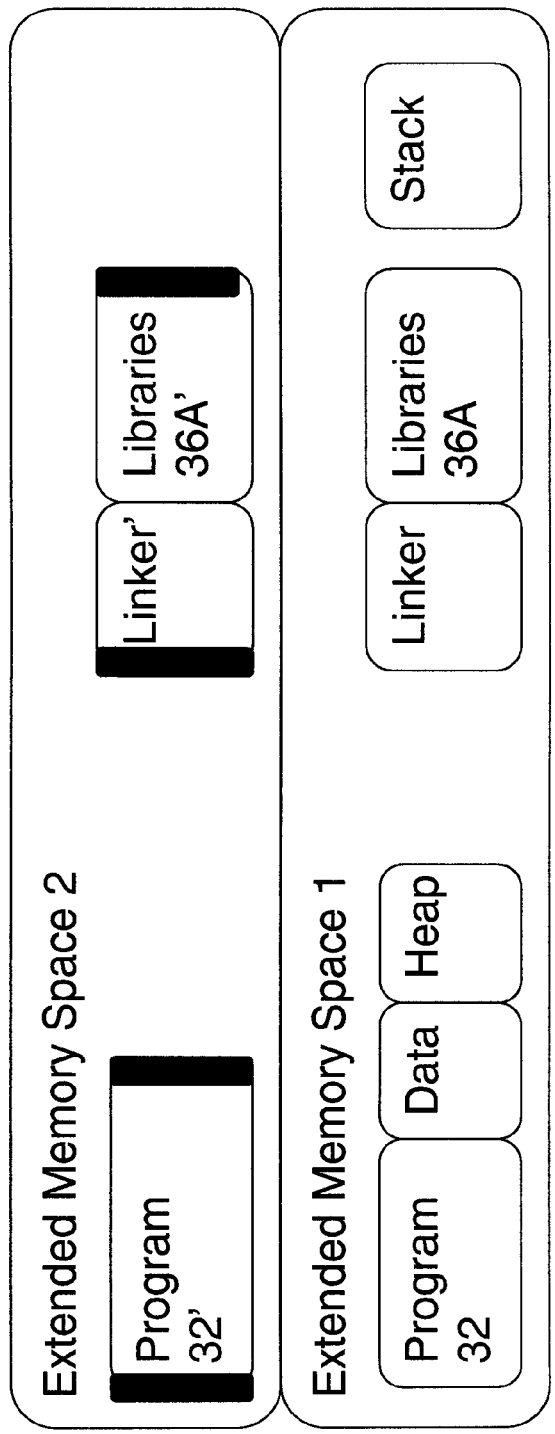

Referring to FIG. 7B, EMS 1 and 2 are shown. EMS 1 comprises program 32 as described with reference to FIG. 2 onwards. EMS 2 contains program 32' with small modifications 70 shown as black stripes. When an opportunity to rewrite binary code is discovered, some other thread of execution (which could be a thread in the subject program process, or another process with access to the subject application's EMS 1, or the operating system kernel) modifies the writable code accessible via EMS 2. This modification takes place in a per-page copy-on-write fashion, so that unmodified physical pages can be shared between EMS 1 and EMS2.

In this manner, binary code can be arbitrarily rewritten, but any attempt by the subject program to inspect its own code will yield the original, unmodified code. The same applies to any program, for example a debugger. However it would be possible to allow certain programs to examine EMS 2 for presenting information about the optimized code to the developer in addition to their original code.

Figure 7C:
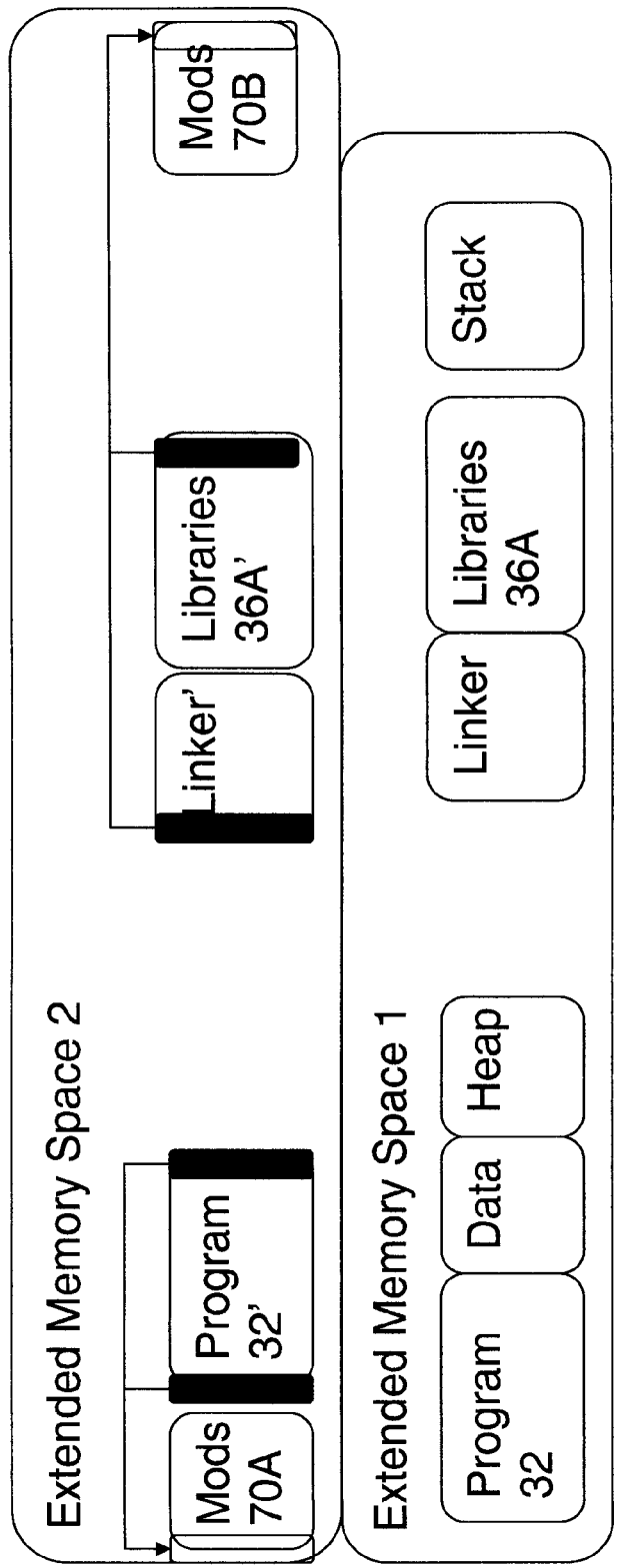

Referring to FIG. 7C, EMS 1 and 2 are shown. EMS 1 comprises program 32. EMS 2 contains program 32', small modifications 70 and larger modifications 70A and 70B.

It is problematic to arbitrarily rewrite binary code in-place, because it is impossible to determine whether there exists, elsewhere in the subject application, an instruction that will transfer control flow into the middle of the rewritten region, which could result in program misbehavior if the code has been rewritten or otherwise reorganized.

Therefore, the only way to reliably perform code modification is to replace only a single instruction at the entry point to the subject code that is to be rewritten, and have that instruction transfer control to the alternative code block. In this way, control transfers into the middle of the original subject code block will always continue to execute the original subject code, and program misbehavior is thus avoided.

On the POWER architecture, the only adequate single instruction that can achieve the desired control transfer is the branch absolute instructions ('ba'). This instruction allows control to be transferred to either the top or bottom 32 megabytes of address space.

The preferred embodiment provides a region (not necessarily all 64 megabytes) set aside for use by runtime optimization for access by a branch absolute instruction like 'ba' or similar. FIG. 7C illustrates this, note how optimized code, Mods 70A and 70B, are present in EMS 2 but not EMS 1, and thus is invisible to the subject application.

Figure 7D:
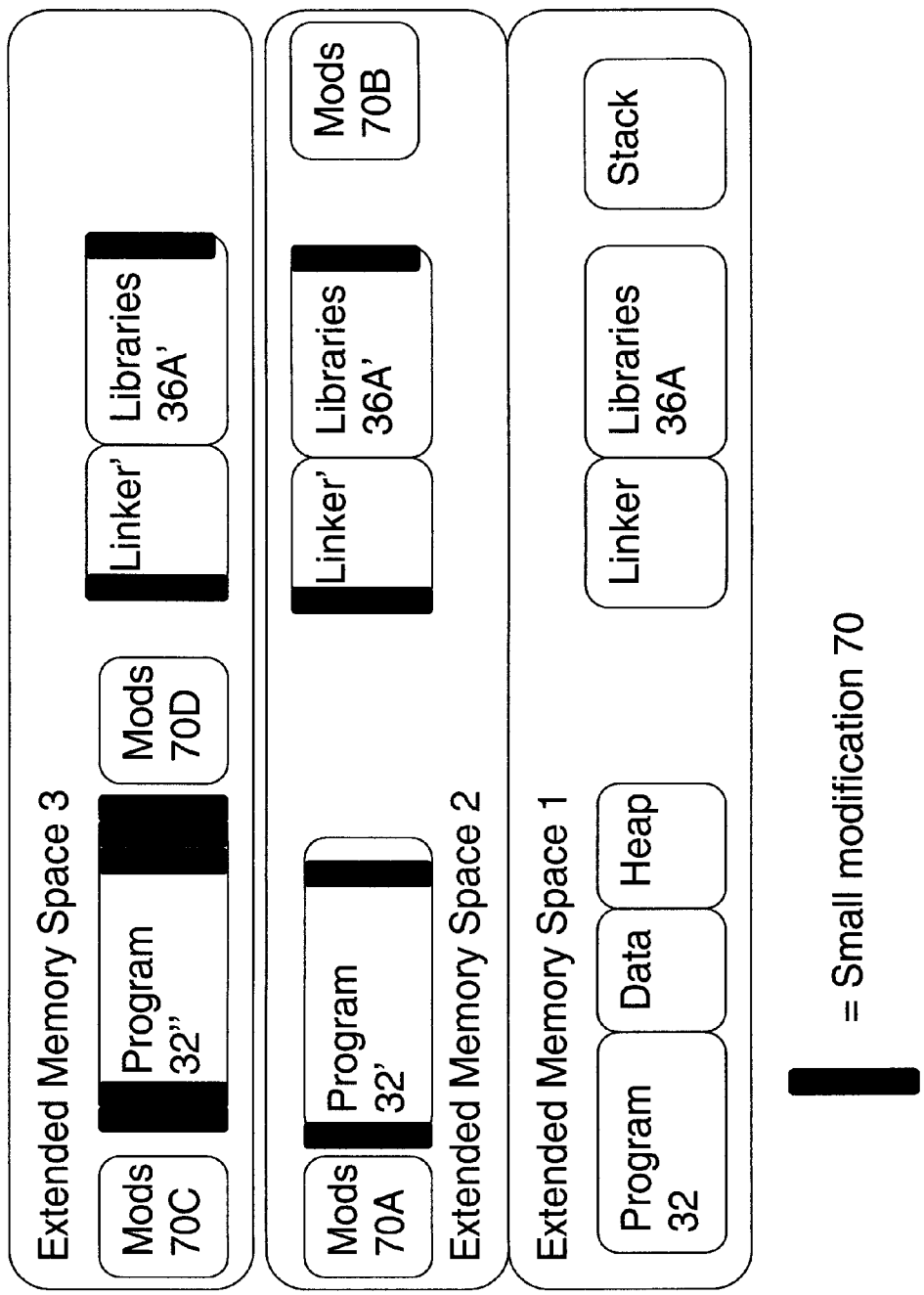

Referring to FIG. 7D, EMS 1, 2 and 3 are shown. EMS 1 comprises program 32. EMS 2 comprises program 32', small modifications 70 and larger modifications 70A and 70B. EMS 3 comprises program 32'', small modifications 70 and larger modifications 70C and 70D. This demonstrates how more than one modified version of program 32 can be modified and executed.

Referring to FIG. 7E, EMS 1, 2 and 3 are shown. EMS 1 comprises program 32. EMS 2 contains program 32' copied from program 30 and with trap modifications 72. EMS 3 contains program profile 74 linked to the trap modification 72 and able to communicate with the modifications to receive profile information. Enhancements to the preferred embodiment use multiple address spaces for efficient profiling of the subject application's behaviour.

If rewriting binary code to improve performance, it is important that profiling information can be collected as efficiently as possible, as any overhead introduced during the profiling process must be won back by the optimized code in order to obtain an improvement.

This enhancement to the embodiment proposes that runtime profiling information be collected using a sample-based architecture. This sampling will highlight hotspots in code where time is being spent, or where branch predicts wrongly or cache misses are frequent.

In order to ensure that profiling is as efficient as possible, an additional extended memory space is used to provide corresponding mapping between an executable processor instruction and data. Advantageously the instruction bit size is the same as the data word. In the Power processor example the instruction bit size is 32-bits and a data word in the extended memory is 32-bits.

The operating system would provide a mechanism to efficiently handle the hardware traps arising from sample-based profiling activity. Operating systems such as AIX can provide "Fast Traps" that deliver a signal back to problem state in 30 cycles or so. This enhancement to the embodiment would use a similar runtime sampling mechanism, with a hardware interrupt occurring during execution of the instruction at address x in EMS 2 simply performing a problem state increment of address x in EMS 3, before resuming program at the point of the interrupt. This would provide a very cheap way of collecting profiling data, and a separate background thread or process could periodically analyze the sample data, looking for optimization opportunities.

OTHER EMBODIMENTS

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

Notices

*IBM, Express, Lotus, Sametime, AIX, POWER, POWER7 are trademarks of International Business Machines in the US and/or other countries. Linux® is the registered trademark of Linus Torvalds in the U.S. and other countries.

The invention claimed is:

1. A processor-implemented method for allowing modification of executable program code in a computer platform, said computer platform supporting multiple virtual address spaces using a common physical memory, the method comprising:

identifying a program in a first virtual address space of said multiple virtual address spaces;

identifying an enhancement to the program;

copying the program into a second virtual address space of said multiple virtual address spaces different from said first virtual address space;

modifying the program copy in the second virtual address space to provide an enhanced program corresponding to the enhancement; and configuring the platform to execute the enhanced program in the second virtual address space, wherein during execution of the enhanced program in the second virtual address space, data read and write operations specified by instructions of the enhanced program in the second virtual address space are performed by accessing data addresses in the first virtual address space.

2. A processor-implemented method according to claim 1 further comprising:

providing a third address space;

identifying an existing program in an existing address space;

copying the existing program into a third address space;

modifying the existing program copy in the third space; and configuring the platform to execute the enhanced program in the third address space.

3. A processor-implemented method according to claim 1 wherein modifications can be performed during execution of the unmodified program.

4. A processor-implemented method according to claim 1 wherein the modification to the program is a branch instruction that allows program execution to be passed to further code in addition to the program.

5. A processor-implemented method according to claim 1 wherein the further code is placed at the top or bottom of the second address space and the modification is a single word branch instruction to the top or bottom of an address space.

6. A processor-implemented method according to claim 1 wherein access to the extended space is controlled by the operating system wherein modifications cannot be detected from a program that has not been granted access by the operating system.

7. A computer program product comprising non-transitory computer readable recording medium having computer readable code stored thereon for allowing modification of executable program code in a computer platform, said computer platform supporting multiple virtual address spaces using a common physical memory, said computer readable code which when loaded onto a computer system and executed performs the following steps:

identifying a program in a first virtual address space of said multiple virtual address spaces;

identifying an enhancement to the program;

copying the program into a second virtual address space of said multiple virtual address spaces different from said first virtual address space;

modifying the program copy in the second virtual address space to provide an enhanced program corresponding to the enhancement; and configuring the platform to execute the enhanced program in the second virtual address space, wherein during execution of the enhanced program in the second virtual address space, data read and write operations specified by instructions of the enhanced program in the second virtual address space are performed by accessing data addresses in the first virtual address space.

8. A computer program product according to claim 7 further comprising:
provided a third address space;
identifying an existing program in an existing address space;
copying the existing program into a third address space;
modifying the existing program copy in the third space; and
intercepting commands for executing the existing program and executing the modified existing program copy in the third address space.

9. A computer program product according to claim 7 wherein modifications can be performed during execution of the unmodified program.

10. A computer program product according to claim 7 wherein the modification to the program is a branch instruction that allows program execution to be passed to further code in addition to the program.

11. A computer program product according to claim 7 wherein the further code is placed at the top or bottom of the second address space and the modification is a single word branch instruction to the top or bottom of an address space.

12. A computer program product according to claim 7 wherein the modification allows for profiling code to be inserted into the program code for efficient collection of runtime information.

13. A computer program product according to claim 7 wherein access to the extended space is controlled by the operating system wherein modifications cannot be detected from a program that has not been granted access by the operating system.

* * * * *